United States Patent
O'Bryan

[19]

[11] Patent Number: 6,149,418
[45] Date of Patent: Nov. 21, 2000

[54] DUAL MOTOR DRIVE SYSTEM FOR AN INJECTION MOLDING MACHINE

[75] Inventor: James E. O'Bryan, Cincinnati, Ohio

[73] Assignee: Milacron Inc., Cincinnati, Ohio

[21] Appl. No.: 09/294,081

[22] Filed: Apr. 16, 1999

[51] Int. Cl.[7] .................................................. B29C 45/77
[52] U.S. Cl. ............................................................. 425/145
[58] Field of Search ................................... 425/145, 149, 425/150

[56] References Cited

U.S. PATENT DOCUMENTS

| | | | |
|---|---|---|---|
| 2,653,283 | 9/1953 | Feldhausen | 318/46 |
| 2,958,024 | 10/1960 | Solis | 318/19 |
| 3,688,167 | 8/1972 | Ivey et al. | 318/45 |
| 4,689,527 | 8/1987 | Wu | 318/45 |
| 4,741,685 | 5/1988 | Inaba et al. | 425/145 |
| 4,798,999 | 1/1989 | Tecinsky | 318/45 |
| 4,828,475 | 5/1989 | Kamiguchi | 425/150 |
| 4,828,476 | 5/1989 | Yoshiharu et al. | 425/150 |
| 4,877,388 | 10/1989 | Inaba et al. | 425/150 |
| 4,990,084 | 2/1991 | Reinhart | 425/590 |
| 5,417,558 | 5/1995 | Heindel et al. | 425/145 |
| 5,421,712 | 6/1995 | Laing | 425/145 |
| 5,679,384 | 10/1997 | Emoto | 425/145 |

FOREIGN PATENT DOCUMENTS

| | | |
|---|---|---|
| 554038 | 6/1943 | United Kingdom . |
| 566635 | 1/1945 | United Kingdom . |

*Primary Examiner*—Tim Heitbrink
*Attorney, Agent, or Firm*—Stephen H. Friskney

[57] ABSTRACT

An electric-motor-powered drive for providing increased output torque within a predetermined space envelope. A pair of electric motors are disposed in end-to-end relationship with their respective output drive shafts in opposed, coaxial relationship. A coupling member extends between the respective motor output shafts to mechanically couple them together for joint rotation in the same direction of rotation and at the same rotational speed. The control circuit for one of the motors includes an inverter to cause the output shaft of the one motor to rotate in the opposite direction from that of the other motor so that torque at the output of the combined motors at the coupling member is the sum of the torques of each of the individual motors

8 Claims, 2 Drawing Sheets

DUAL MOTOR DRIVE SYSTEM FOR AN INJECTION MOLDING MACHINE

BACKGROUND OF THE INVENTION

1. Field of the Invention

The present invention relates to drive motors for providing power for operating injection molding machines, and more particularly to electric motor drive systems utilizing two electric motors mechanically coupled together.

2. Description of the Related Art

For a number of years injection molding machines for molding plastic parts were hydraulically operated. The machines included linear hydraulic actuators for providing linear motion and rotary hydraulic motors for providing rotational motion. As the need for greater precision of positioning of the respective elements of such machines during an operating cycle increased it became apparent that hydraulically-powered elements were limited in positioning precision because of the compressibility of hydraulic fluids and the volumetric changes of the fluids with changes in fluid temperature. Accordingly, several years ago electric motors began to be utilized in mechanical drive systems for such machines, principally because of the closer position control that can be obtained through the use of shaft angle encoders and other electrically-operated position-sensing devices. In particular, servomotors provide the desired degree of control precision by virtue of the ability to closely control shaft angles and current supply, enabling close control over motor shaft torque, shaft position, and shaft angular velocity, either by open-loop or closed-loop control techniques.

In addition to the ability to more precisely control an electrically-powered device as compared with an hydraulically-powered device, hydraulic devices are often more noisy than electrical devices. Further, considerable energy is wasted in hydraulic machines by reason of the heating of the hydraulic fluid that occurs as the hydraulic fluid is pressurized during operation of the device, and the consequent need to cool the fluid by means of oil or water coolers or other forms of heat sinks. And in this era of greater attention to environmental aspects, the mineral oils in hydraulic fluids are sometimes environmentally undesirable, requiring special containers and special disposal techniques.

One disadvantage of electric motors is that when higher power output is required the size, weight, and cost of electric motors is greater that that for hydraulic motors. Because the degree of control precision is so much greater for electric motors as compared with mechanical and hydraulic systems, however, electric motors are becoming more and more ubiquitous, particularly in smaller capacity injection molding machines, those having clamp tonnages of up to about 300 tons. When larger outputs are required the limitations of power output and the increase in the diameters for larger electric motors has limited the sizes of injection molding machines with which electric drive systems can be employed.

AC servomotors are often utilized in powering injection molding machines. However, commercially available AC servomotors are limited with respect to maximum output torque. Thus, the capacity of an injection molding machine with which such AC servomotors can serve as the power source is limited by the output torque of commercially available motors. And although two such motors can be coupled by means of belts or gears to provide combined motor torque output, such systems occupy additional space and become more complex. Additionally, such systems also add mechanical elements that reduce the precision of control of the output from the combined motors because of belt stretch, mechanical wear, and the like factors that are inherent in mechanical drive elements.

It is an object of the present invention to provide a drive system whereby electric motors can be employed to power machinery where greater maximum torque outputs are required than can be obtained using a single commercially-available motor.

It is another object of the present invention to provide a drive system whereby the overall size of an electrically-powered injection molding machine requiring a high output torque electric motor is maintained within desired space limitations.

SUMMARY OF THE INVENTION

Briefly stated, in accordance with one aspect of the present invention, an electric motor drive system is provided whereby higher horsepower output is attainable without excessively increasing the size envelope of an electrically-powered injection molding machine. First and second electric motors are provided, each having a housing and an output shaft extending axially from a drive end of the housing. The motors are oriented in spaced relationship with each other and have their respective drive ends in opposed relationship with the axes of their respective output shafts disposed coaxially. A motor coupling member extends between and couples together the output shafts of the first and second motors so that the motor output shafts rotate together in the same direction of rotation and at the same rotational speed. A motor control is provided for controlling the speed and torque of the first and second motors, the motor control including a first control circuit coupled with the first motor for operating the first motor output shaft to rotate in a predetermined direction of rotation relative to the motor output shaft axis. A second control circuit is coupled with the second motor for operating the second motor output shaft to rotate in the same predetermined direction of rotation as that of the first motor output shaft relative to the motor output shaft axis. The coupling of the motors and their respective controls provides at the motor coupling member a combined output torque that is the sum of the output torques of the first and second motors. In that regard, the second motor control circuit includes an inverter for shifting the phase of drive current supplied to the second motor by 180° relative to the phase of drive current supplied to the first motor so that the coupled output drive shafts rotate in the same direction relative to the drive shaft axes.

DESCRIPTION OF THE PREFERRED EMBODIMENTS

Figure 1:
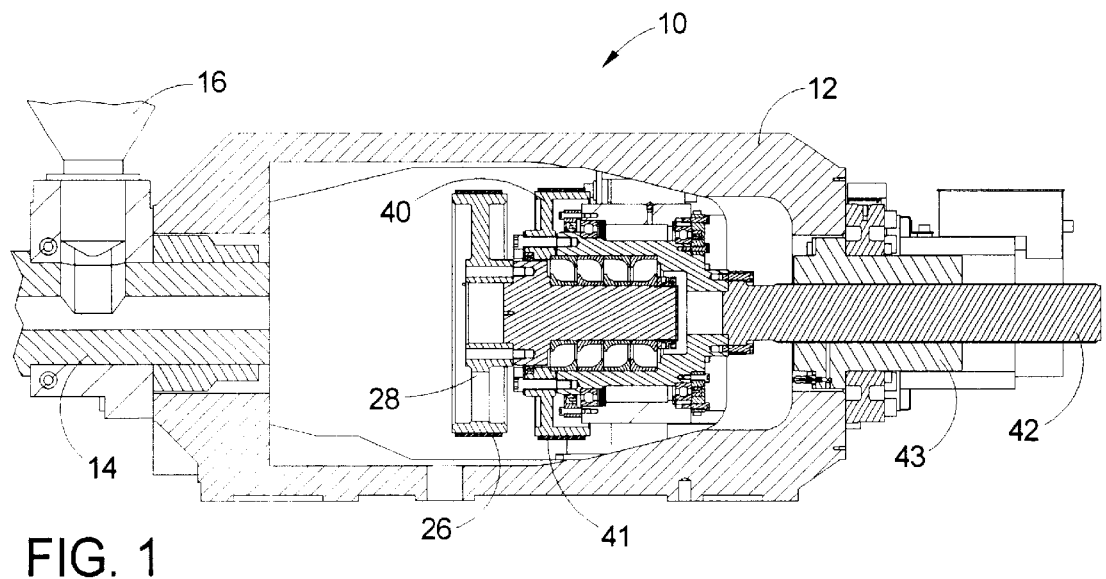
FIG. 1 is a fragmentary, side elevational view, in cross section, of a plastication screw drive system for a reciprocating screw injection molding machine.
Figure 2:
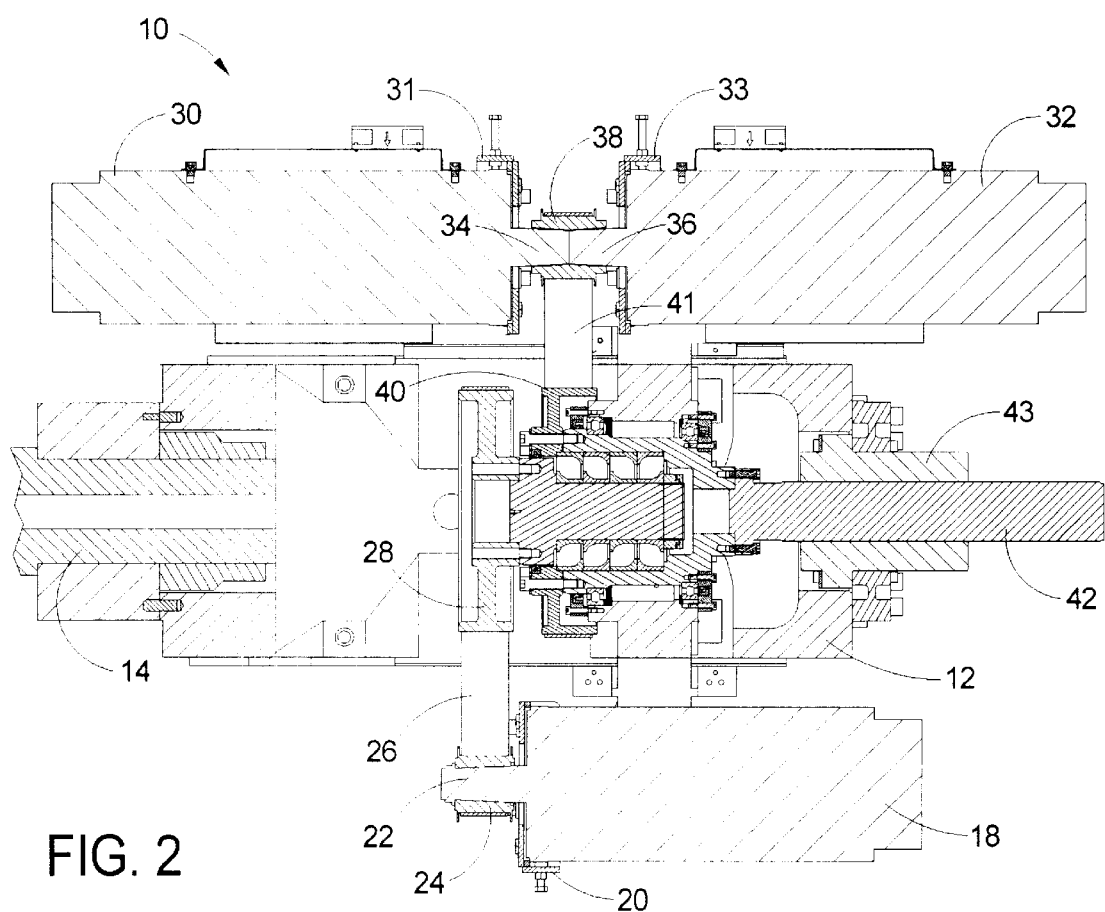
FIG. 2 is a fragmentary, top plan view, in cross section, of the plastication screw drive system shown in FIG. 1.

Referring to the drawings, and particularly to FIGS. 1 and 2 thereof, there is shown a drive system 10 for an injection unit of an injection molding machine. The machine includes a drive housing 12 from which a tubular barrel 14 extends that carries a rotating and reciprocating plastication screw (not shown) of a type well-known to those skilled in the art. A material feed hopper 16 is positioned above barrel 14 to receive and to feed to the interior of barrel 14 material to be plasticated and injected by the screw.

Referring now to FIG. 2, the plastication screw is rotated by an electric motor 18 that is supported by a bracket 20 carried by and supported from housing 12. Motor 18 includes an output drive shaft 22 to which a drive pulley 24 is secured. A drive belt 26 passes around drive pulley 24 to rotate a driven pulley 28 that is operatively coupled with the plastication screw for joint rotation therewith.

After the molding material has been plasticated, the plastication screw is axially moved within barrel 14, toward the left as viewed in FIGS. 1 and 2, for effecting an injection stroke to inject a desired quantity of plasticated molding material into a mold (not shown). The power for the injection stroke is provided by a drive system that includes pair of electric motors, a first injection motor 30 and a second injection motor 32. Motor 30 is supported by a bracket 31 that is carried by and supported from drive housing 12 and has an output drive shaft 34 that extends outwardly from the housing of motor 30. Similarly, motor 32 is supported by a bracket 33 that is also carried by and supported from drive housing 12, and motor 32 has a corresponding output drive shaft 36 that extends outwardly from the housing of motor 32. As shown in FIG. 2, motors 30 and 32 are so disposed relative to each other that their respective output shafts are spaced from each other and face each other in opposed relationship, and the axes of their respective output shafts are coaxial.

A drive shaft coupling member 38, which can be in the form of an annular sleeve as shown, extends between and securely couples together output drive shafts 34 and 36 so that they rotate together in the same direction of rotation and at the same rotational speed. Coupling member 38 defines a drive pulley to rotate a driven pulley 40 that is driven by belt 41. Driven pulley 40 is operatively coupled with a drive screw 42 rotatably carried in a fixed nut 43 retained by housing 12. Rotation of drive screw 42 causes the plastication screw to move axially, thereby either effecting an injection stroke or a retraction stroke of the plastication screw.

The two-motor system shown permits two smaller output motors to be combined to provide a higher output torque than can be achieved by only a single motor. In that regard, because AC servomotors, which are a preferred power source for such machines by virtue of the ability to more precisely control their output, are limited in their maximum torque output to levels of about 1000 nm, and consequently the application of such motors is limited to injection molding machines having a molding material injection quantity of about 100 oz. Higher motor torque outputs are required to inject larger quantities of molding material, and the two-motor drive system herein described enables the use of such motors on larger capacity injection molding machines.

Figure 3:
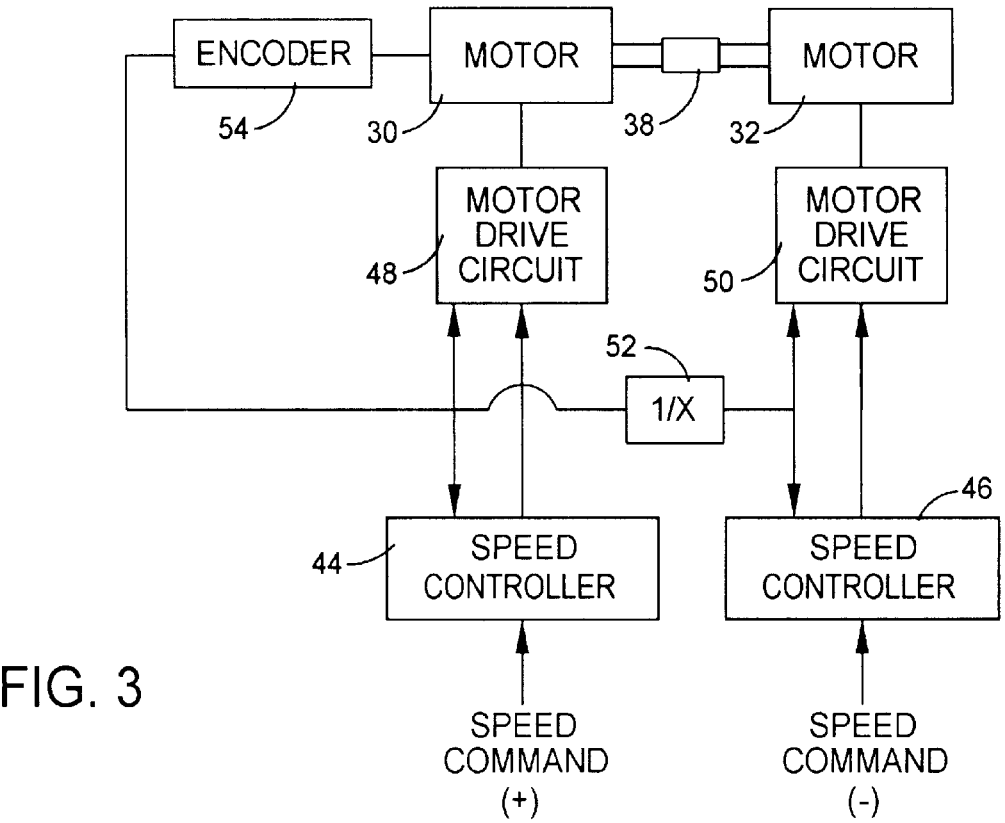
FIG. 3 is a block diagram showing a control arrangement for a dual motor drive of the type shown in FIG. 2.

Control of such a two-motor drive system can be effected by control system of the type shown in FIG. 3. The output drive shafts of motors 30 and 32 are connected together for joint rotation by coupling member 38. A motor speed command is provided to respective speed controllers 44, 46, which generate corresponding current commands for the respective motor drive circuits 48, 50. An encoder 54 is connected to motor 30 and is used to provide rotor position feedback to motor drive circuits 48, 50. Rotor position feedback from the encoder 54 is also supplied to speed controllers 44, 46, where it is used to derive a velocity feedback. The position feedback supplied to the motor drive 50 and speed controller 46 is inverted in a signal inverter 52, so that motor 32 rotates in the opposite direction from motor 30, causing the respective motor output shafts rotate in the same direction to produce a combined output for the motors. The speed commands to drive circuits 48, 50 are adjusted as necessary to maintain the desired rotational speed for each of motors 30 and 32.

Figure 4:
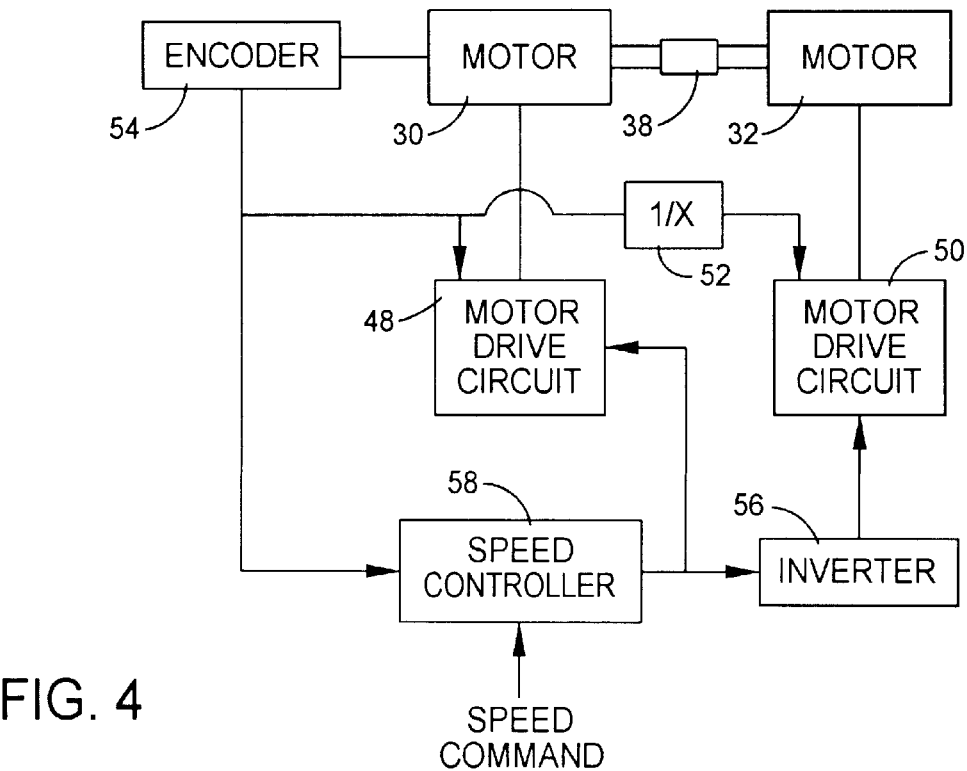
FIG. 4 is a block diagram showing an alternate control arrangement for a dual motor drive of the type shown in FIG. 2.

Alternatively, a two-motor drive system as taught by the present invention can be controlled by a system of the type shown in FIG. 4. The output drive shafts of motors 30 and 32 are connected together as discussed above for joint rotation by coupling member 38. A single speed controller 58 is provided to generate a single current command. While the command from the controller 58 is received directly by motor drive circuit 48 for the motor 30, the speed command for the drive circuit 50 of motor 32 is inverted in a signal inverter 56, so that motor 32 rotates in the opposite direction from motor 30. Accordingly, the respective motor output shafts rotate in the same direction to effect a combined output for the motors 30, 32. A single encoder 54 is connected to motor 30 to provide rotor position feedback for the respective drive circuits 48,50 where it is used to derive a velocity feedback. Note that the position feedback supplied by encoder 54 to motor drive circuit 50 is inverted by signal inverter 52 in order to provide proper commutation of the motor 32.

Although particular embodiments of the present invention have been illustrated and described, it will be apparent to those skilled in the art that changes in modifications can be made without departing from the spirit of the present invention. Accordingly, it is intended to encompass within the appended claims all such changes and modifications that fall within the scope of the present invention.

What is claimed is:

1. An injection molding machine having a drive system comprising:
  a. first and second electric motors each having a housing and an output shaft extending axially from a drive end of the housing, wherein the motors are oriented in spaced relationship with each other and have their respective drive ends in opposed relationship with the axes of their respective output shafts disposed coaxially;
  b. a motor coupling member extending between and coupling together the output shafts of the first and second motors so that the motor output shafts rotate together in the same direction of rotation and at the same rotational speed;
  c. a motor control for controlling the speed and torque of the first and second motors, the motor control including a first motor drive circuit coupled with the first motor for operating the first motor output shaft to rotate in a predetermined direction of rotation, and a second motor drive circuit coupled with the second motor for operating the second motor output shaft to rotate in the same predetermined direction of rotation as that of the first motor output shaft, to provide at the motor coupling member a combined output torque that is the sum of the output torques of the first and second motors, wherein the second motor drive circuit includes an inverter for shifting the phase of drive current supplied to the second motor relative to the phase of drive current supplied to the first motor.

2. An injection molding system in accordance with claim 1, wherein each of the first and second motors has substantially the same maximum output torque at the same rotational speed.

3. An injection molding system in accordance with claim 1, wherein each of the first and second motors has a different maximum output torque at the same rotational speed.

4. An injection molding system in accordance with claim 1, wherein the coupling member includes a connecting sleeve for mechanically connecting together for joint rotation the respective output shafts of the first and second motors, and a drive member carried by the coupling member for transferring combined motor output torque to a driven member.

5. An injection molding system in accordance with claim 4, wherein the drive member is a pulley for receiving and carrying a drive belt.

6. An injection molding system in accordance with claim 4, wherein the driven member is a mechanism in an injection unit of an injection molding machine.

7. An injection molding system in accordance with claim 6 wherein the mechanism includes a screw for imparting axial movement to an injection member for injecting molding material into a mold.

8. An injection molding system in accordance with claim 1, wherein the first and second motors are each AC servomotors.

\* \* \* \* \*